US009605640B2

(12) United States Patent
Lamure et al.

(10) Patent No.: US 9,605,640 B2
(45) Date of Patent: Mar. 28, 2017

(54) ELECTRIC STARTER WITH INTEGRATED ELECTRONIC FILTER FOR INTERNAL COMBUSTION ENGINE

(71) Applicant: VALEO EQUIPEMENTS ELECTRIQUES MOTEUR, Créteil (FR)

(72) Inventors: Mickaël Lamure, Lyons (FR); Soosin Kim, Hwasung Kyungido (KR)

(73) Assignee: Valeo Equipements Electriques Moteur (FR)

( * ) Notice: Subject to any disclaimer, the term of this patent is extended or adjusted under 35 U.S.C. 154(b) by 387 days.

(21) Appl. No.: 14/359,274

(22) PCT Filed: Nov. 15, 2012

(86) PCT No.: PCT/FR2012/052634

§ 371 (c)(1),
(2) Date: May 19, 2014

(87) PCT Pub. No.: WO2013/072631

PCT Pub. Date: May 23, 2013

(65) Prior Publication Data

US 2015/0090212 A1 Apr. 2, 2015

(30) Foreign Application Priority Data

Nov. 18, 2011 (FR) .................................... 11 60505

(51) Int. Cl.
*H02P 1/54* (2006.01)
*H02P 5/00* (2016.01)
(Continued)

(52) U.S. Cl.
CPC ............ *F02N 11/08* (2013.01); *F02N 11/087* (2013.01); *F02N 15/006* (2013.01);
(Continued)

(58) Field of Classification Search
CPC ........ H02K 17/30; H02K 5/225; H02K 11/02; H02K 11/33; H02K 11/40; H02K 11/024;
(Continued)

(56) References Cited

U.S. PATENT DOCUMENTS 3,924,147 A * 12/1975 Tarnow ................ H02K 11/026 310/239
4,716,326 A * 12/1987 Fisher ...................... H01H 1/26 310/68 E (Continued)

FOREIGN PATENT DOCUMENTS

DE 10 2012 107 011 A1 * 4/2013
FR 2843427 2/2004

(Continued)

*Primary Examiner* — Paul Ip
(74) *Attorney, Agent, or Firm* — Berenato & White, LLC

(57) ABSTRACT

Electric starter for internal combustion engine comprising: an electric motor (M) combined with means (R, L) for driving the internal combustion engine and an electronic filter (10) that is arranged on a power circuit (3) of the electric motor (M) that is suitable for at least reducing the electromagnetic disturbance caused by the operation of the electric motor (M). The electronic filter (10) is placed inside a cover (11, 30) of the starter.

20 Claims, 3 Drawing Sheets

(51) Int. Cl.

| | |
|---|---|
| ***F02N 11/08*** | (2006.01) |
| ***F02N 15/00*** | (2006.01) |
| *F02N 15/02* | (2006.01) |
| *F02N 15/04* | (2006.01) |
| *F02N 15/06* | (2006.01) |

(52) U.S. Cl.
CPC ...... *F02D 2400/18* (2013.01); *F02D 2400/21* (2013.01); *F02N 15/022* (2013.01); *F02N 15/046* (2013.01); *F02N 15/067* (2013.01)

(58) Field of Classification Search
CPC ........ H02K 11/23; H02K 11/026; H02K 5/10; H02K 5/148; H02K 5/20; H02K 7/1166; H02K 11/01; H02K 11/21; H02K 11/25
USPC ...... 318/34, 139; 290/38 R; 310/68 R, 68 E; 123/179.1
See application file for complete search history.

(56) References Cited

U.S. PATENT DOCUMENTS 4,788,763 A * 12/1988 Fisher ...................... H01H 1/26 200/80 R
4,853,569 A * 8/1989 Lewus .................. H02K 11/02 310/68 E
5,146,095 A * 9/1992 Tsuchiya ............. F02N 11/0866 290/38 R
5,155,373 A * 10/1992 Tsuchiya ............. F02N 11/0866 123/179.1
5,155,374 A * 10/1992 Shirata ................ F02N 11/0866 123/179.1
5,157,267 A * 10/1992 Shirata ................ F02N 11/0866 123/179.3
5,245,237 A * 9/1993 Fisher .................... H02K 5/225 310/89
5,256,956 A * 10/1993 Tsuchiya ................ B32B 27/06 320/128
5,285,862 A * 2/1994 Furutani .................. B60K 6/28 180/65.245
5,309,052 A * 5/1994 Kim ....................... H02K 11/02 174/350
5,430,931 A * 7/1995 Fisher .................... H02K 5/225 29/596
5,548,169 A * 8/1996 Iwasa ..................... H02K 17/30 310/68 R
5,656,878 A * 8/1997 Nakata ................... H02K 5/225 310/67 R
5,818,115 A * 10/1998 Nagao ..................... F02N 11/04 180/65.1
5,872,411 A * 2/1999 Nakata ................... H02K 5/225 310/67 R
5,937,506 A * 8/1999 Nakata ................... H02K 5/225 174/541
6,104,157 A 8/2000 Kramer et al.
6,215,214 B1 * 4/2001 Fisher ...................... H02K 5/04 310/85
6,325,035 B1 * 12/2001 Codina ............... F02N 11/0866 123/179.1
6,381,153 B1 * 4/2002 Brussels ................ H02K 11/02 363/39
6,657,338 B2 * 12/2003 Fisher .................... H02K 17/30 310/68 R
6,831,382 B1 * 12/2004 Lyle ......................... H02K 5/04 310/12.13
6,930,457 B2 * 8/2005 Zack ...................... H02K 11/02 318/139
6,933,638 B2 * 8/2005 Hirth ...................... H02K 5/225 310/62
7,038,564 B1 5/2006 Kusumoto et al.
7,369,378 B2 * 5/2008 Sunaga ..................... H02P 7/29 361/118
7,659,678 B2 * 2/2010 Maiocchi ............. H02M 3/156 318/400.22
7,786,635 B2 * 8/2010 Gasser ..................... H02K 5/10 310/43
8,587,238 B2 * 11/2013 Maiocchi ............. H02M 3/156 318/400.3
2003/0098621 A1 * 5/2003 Fisher .................... H02K 17/30 310/89
2004/0066157 A1 * 4/2004 Zack ...................... H02K 11/02 318/139
2005/0003710 A1 * 1/2005 Congdon ............ F02N 11/0866 439/620.01
2005/0093382 A1 * 5/2005 Hirth ...................... H02K 5/225 310/62
2005/0099155 A1 * 5/2005 Okuda ................ F02N 11/0866 320/107
2005/0231880 A1 * 10/2005 Sunaga ..................... H02P 7/29 361/118
2005/0242757 A1 * 11/2005 Biamonte ............... H02P 25/04 318/61
2006/0113850 A1 * 6/2006 Togashi ............... H02K 11/026 310/51
2007/0241702 A1 * 10/2007 Youkai ...................... H02P 7/29 318/400.25
2007/0247091 A1 * 10/2007 Maiocchi ............. H02M 3/156 318/400.04
2008/0036292 A1 * 2/2008 Sakai ...................... B60T 8/368 303/11
2009/0152962 A1 * 6/2009 Gasser ..................... H02K 5/10 310/43
2009/0206694 A1 * 8/2009 Kamiya ............... H01R 39/383 310/239
2010/0164428 A1 7/2010 Xu et al.
2011/0068723 A1 * 3/2011 Maiocchi ............. H02M 3/156 318/400.3
2011/0134584 A1 * 6/2011 Stockman ................ H01G 5/38 361/328
2011/0169383 A1 * 7/2011 De Filippis .......... H02K 11/026 310/68 R
2011/0211980 A1 * 9/2011 Shibuya ................ F04B 39/121 417/410.1
2012/0081193 A1 * 4/2012 Shirakawa ............... H03H 7/06 333/176
2013/0082552 A1 * 4/2013 Shoji ....................... F02N 11/04 310/71
2013/0082553 A1 * 4/2013 Shoji ...................... H02K 11/00 310/71

FOREIGN PATENT DOCUMENTS

FR 2934933 2/2010
GB 2 249 441 A * 6/1992
JP H0561456 U 8/1993
JP 2011-219919 * 10/2011
JP 2011-219934 * 10/2011
JP P2013-79600 A * 5/2013
WO WO2005/054664 6/2005
WO WO2011/067967 6/2011
WO WO2013/072631 5/2013

* cited by examiner

ELECTRIC STARTER WITH INTEGRATED ELECTRONIC FILTER FOR INTERNAL COMBUSTION ENGINE

CROSS-REFERENCE TO RELATED APPLICATIONS AND CLAIM TO PRIORITY

This application is a national stage application of International Application No. PCT/FR2012/052634 filed Nov. 15, 2012, which claims priority to French Patent Application No. 1160505 filed Nov. 18, 2011, of which the disclosures are incorporated herein by reference and to which priority is claimed.

FIELD OF THE INVENTION

The present invention relates to the technical field of internal combustion engine starters. According to a preferred, but not exclusive application, the invention relates to a motor vehicle internal combustion engine starter.

BACKGROUND OF THE INVENTION

A starter of this type generally comprises an electric motor associated with means for driving the internal combustion engine. The drive means are mostly designed to be coupled to the mobile units of the internal combustion engine during a starting phase of the engine, and to be uncoupled from the internal combustion engine when the engine is running. For this purpose, the starter comprises an electromagnetic switch which is designed firstly to control the power of the electric motor, and secondly to control the coupling and uncoupling of the means for driving the mobile units of the internal combustion engine. The drive means comprise a launcher which is mobile in rotation around itself, and is mobile in axial translation between a position of rest and a position of driving of the internal combustion engine. The launcher is then displaced between its position of rest and its drive position by a lever which is manoeuvred by the electromagnetic switch. Since the starting of the internal combustion engine requires relatively substantial drive torque, the drive means can comprise a reducer assembly which is interposed between the launcher and a drive pinion of the electric motor.

A starter of this type gives full satisfaction as far as its function of starting an internal combustion engine is concerned, but has the disadvantage of being the source of electromagnetic disturbances which are liable in particular to affect the functioning of the electronic equipment of the vehicle. Taking into account the increasing importance of electronic equipment in controlling the functioning and safety of a motor vehicle, the risks of a fault occurring as a result of electromagnetic disturbances generated by the starter are no longer acceptable.

In order to reduce the electromagnetic disturbances it has been proposed to add to the electric power circuit of the starter an electronic filter which is placed on the exterior of the starter, whilst being secured on one or the other of the elements which constitute the starter. An electronic filter of this type generally gives satisfaction as far as its filtering function is concerned. However, a filter of this type has the following disadvantages in particular:

use of a support which is specific to it gives rise to an additional fitting operation and is subject to vibrations;

need for individual connections for its connection to the starter power circuit, and therefore addition of a step which increases the manufacturing time of a starter;

exposure to the conditions of humidity which exist the engine compartment.

The need has therefore become apparent for a new configuration for use of an electronic filter in association with a starter, which makes it possible to eliminate these disadvantages.

SUMMARY OF THE INVENTION

In order to achieve this objective, the invention relates to an electric starter for an internal combustion engine comprising:

- an electric motor associated with means for driving the internal combustion engine, comprising a positive terminal and a negative terminal;
- an electronic filter comprising a positive terminal which is connected electrically to the positive terminal of the motor (M), and is designed at least to attenuate the magnetic disturbances generated by the functioning of the electric motor.

According to the invention, the electronic filter is placed inside a cover of the starter.

The position of the electronic filter inside a cover of the starter makes it possible to protect the electronic filter against climatic conditions which exist inside the engine compartment. In addition, since the electronic filter is an integral part of the starter, it is no longer necessary to include an operation of fitting of the electronic filter after the assembly of the starter, and in particular when the starter is integrated in the power unit. In addition, the fact that the filter is protected by a cover of the starter prevents risks of rupture of the filter support or its connections during handling of the starter. Furthermore, the fact of putting the filter inside the cover makes it possible to avoid modifying the method of fitting of the starter. In fact, in the case of a starter with or without a filter, the cover can be the same, and can contain or does not contain the filter. This adaptability makes possible a saving in production time, in particular in the case of a change of production between a starter with and without a filler.

Electrically connected means connection directly by a conductive cable or a conductive plates which plays no other part except to connect electrically the + terminal of the motor to the filler. Direct connection means the fact that there is no mobile contact or switch to connect the + terminal of the motor to the filter electrically.

According to the invention, the electronic filter can be placed in various locations of the starter. Thus, according one embodiment of the invention, the starter comprises:

- a launcher which is mobile in rotation around itself, and is mobile in axial translation between a position of rest and a position of driving of the internal combustion engine;
- means for rotation of the launcher by the electric motor;
- an electromagnetic switch which is designed firstly to control the power of the electric motor, and secondly to control the displacement of the launcher between its position of rest and its drive position, the switch comprising an output terminal which is connected to the positive terminal of the filter and to the positive terminal of the motor (M);
- at least one cover which partly covers at least the electric motor and/or the electromagnetic switch;

the electronic filter being covered by the cover of the electric motor and/or of the electric switch.

According to a first variant of this embodiment, the cover covers at least partly the electric motor and/or the electromagnetic switch.

According to a second variant of this embodiment, the starter comprises a first cover which covers at least partly the electric motor and a second cover which covers at least partly the electromagnetic switch.

According to a characteristic of this second variant, the first cover covers the electronic filter.

According to another characteristic of this second variant, the second cover covers the electronic filter.

According to a characteristic of the invention, the cover comprises an immobilizing device for immobilizing the electronic filter. Thus, the integration of the electronic filter in the starter, and its immobilization by the cover, makes it less subject to the risks of rupture of its support or of its connections under the effect of the vibrations sustained by the starter during the phases of starting of the internal combustion engine or during the phases of use of the vehicle driven by the engine.

According to a variant of this characteristic, the electronic filter is pressed against a resiliently deformable element for elimination of play. The use of a resiliently deformable element of this type for elimination of play makes possible relatively rough manufacturing and assembly tolerances which are compatible with cheap mass production processes. In addition, the resiliently deformable element for elimination of play can provide a function of damping of the vibrations, and thus protect the electronic filter and its connections.

According to the invention, the electronic filter can be produced in any appropriate manner. In order to reduce the manufacturing costs, the electronic filter can comprise connectors which are crimped onto the lugs of the electronic components which constitute the filter.

It will be appreciated that the different characteristics, variants and embodiments of the invention can be associated with one another according to different combinations, provided that they are not incompatible with one another, and are not exclusive relative to one another.

BRIEF DESCRIPTION OF THE DRAWINGS

In addition, various other characteristics of the invention will become apparent from the description provided with reference to the appended drawings which illustrate non-limiting embodiments of a starter according to the invention, incorporating an electronic filer.

It should be noted that in these figures, the different structural and/or functional elements which are common to the different variants can have the same alphanumerical references.

DETAILED DESCRIPTION OF THE PREFERRED EMBODIMENT(S)

Figure 1:
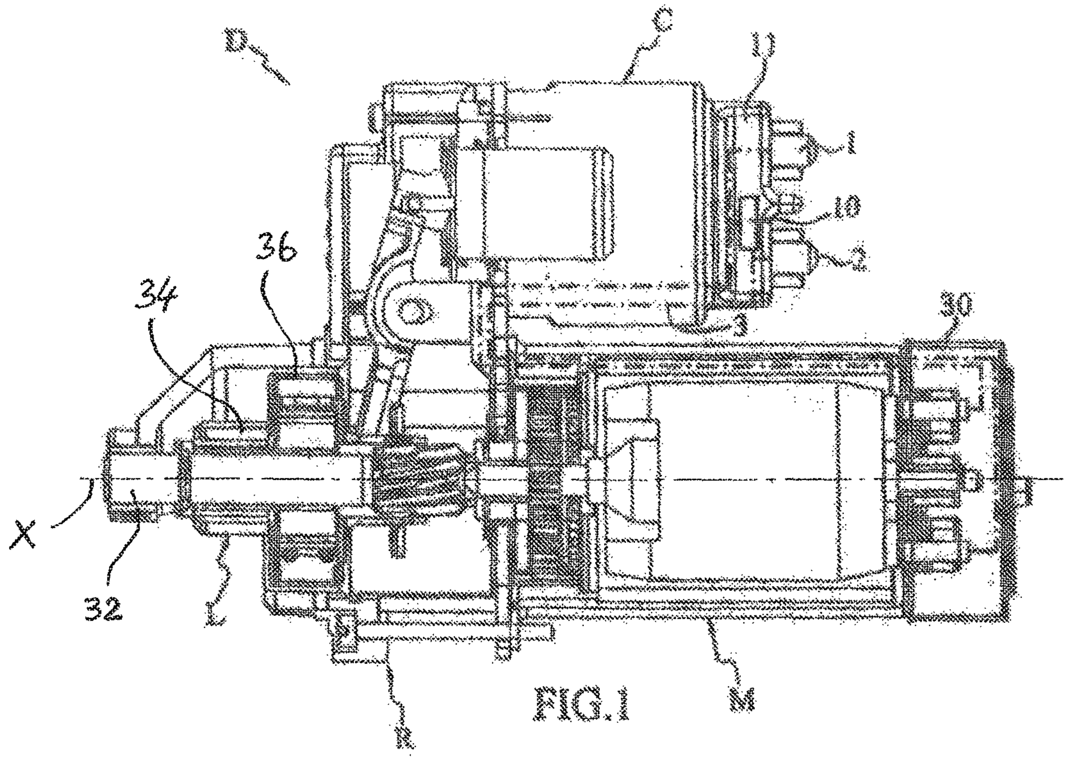
FIG. 1 is a schematic, partially cut out view of a starter for a thermal engine according to the invention.

As can be seen in FIG. 1, a starter D according to the invention for a thermal engine comprises an output shaft 32 rotatable around a longitudinal axis X, a gear speed reducer (or reduction gearing) R on which there is secured an electric motor M controlled by an electromagnetic switch C which also controls a launcher L incorporated in the gear speed reducer R. The gear speed reducer R is a geared device that changes speed and torque of a drive shaft of the electric motor M. The launcher L is slidably mounted on the output shaft 32 and comprises a drive pinion gear 34, and can have a free-wheel device (or one-way clutch) 36. The drive pinion gear 34 is drivingly connected to the output shaft 32 via the free-wheel device 36. The drive pinion gear 34 with the free-wheel device 36 is rotatable around the longitudinal axis (X) by the electric motor M through the gear speed reducer R and is moveable in axial translation along the longitudinal axis X between a position of rest and a position of driving of the internal combustion engine by the electromagnetic switch C. In other words, the pinion gear is configured to be drivingly coupled to the electric motor M. According to another embodiment, the drive shaft of the electric motor is connected directly to the launcher. The launcher L and the gear speed reducer R form together a driving device for driving the internal combustion engine by the electric motor M. The embodiment of a starter D of this type and its component elements are well known to persons skilled in the art, such that only the characteristics necessary for understanding of the invention will be described. Details of such starters are described in FR 2 934 933, FR 2 843 427, and WO 2005/054664, the contents of which being incorporated herein by reference.

Figure 6:
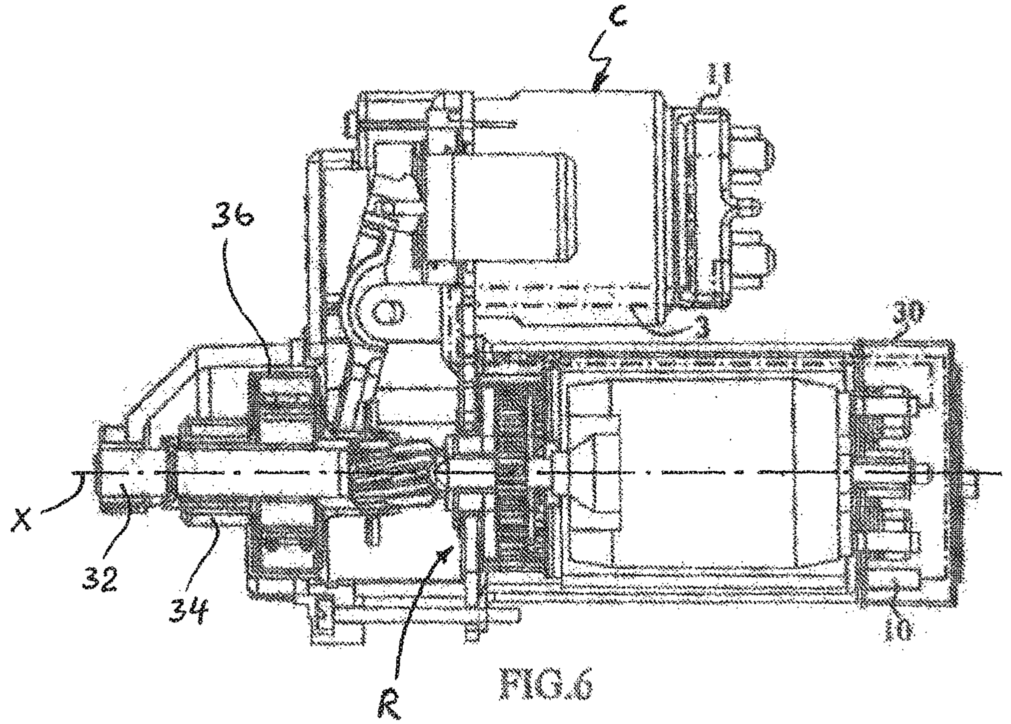
FIG. 6 is a view similar to FIG. 1, showing another possible implantation of an electronic filter of the starter according to the invention.
Figure 7:
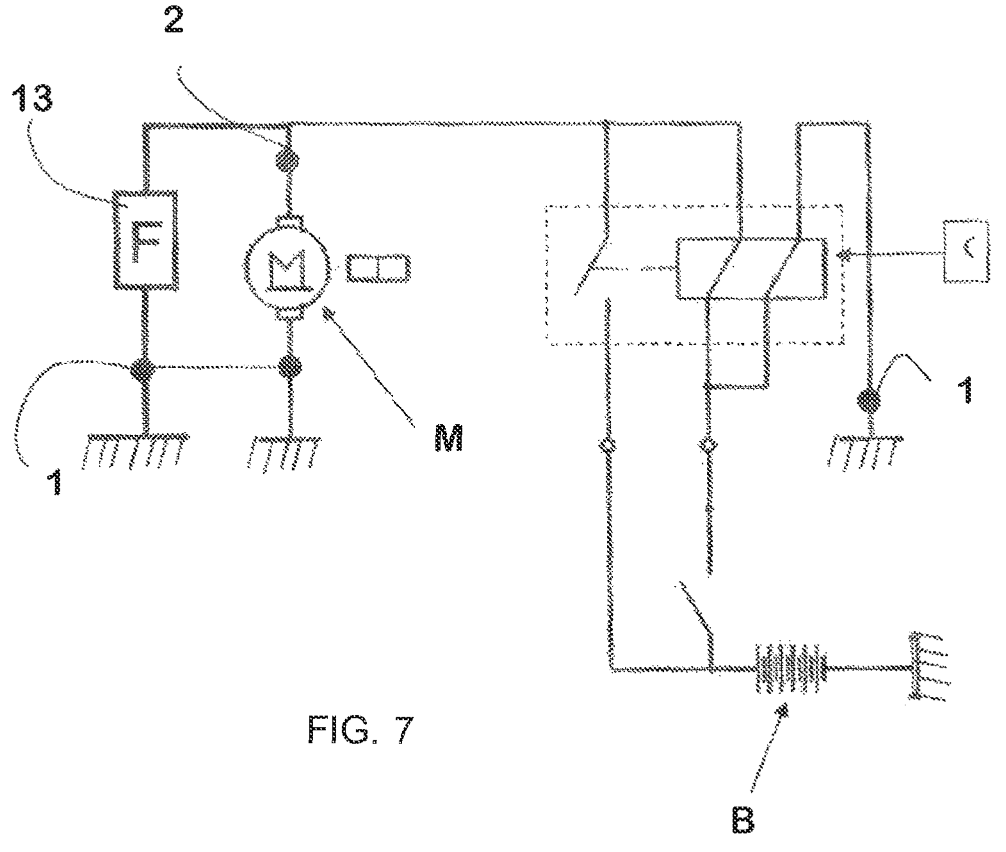
FIG. 7 is an electric diagram comprising a starter, an electromagnetic switch, and a filter.

The electromagnetic switch C comprises two outer terminals 1 and 2 for connection to an electric circuit, not represented, of the vehicle equipped with the starter D. The terminals 1 and 2 are connected in particular to a power circuit 3 of the electric motor M. The power circuit 3, schematised in dot-and-dash lines, extends inside the contactor C of the reducer R and of the electric motor M. The electric circuit is represented in a highly simplified manner in FIGS. 1 and 6, and FIG. 7 represents a process diagram of the electric circuit 3. In this FIG. 7, a battery B supplies the motor, the filter and the switch. In this figure, the mechanical part of the switch which makes it possible to advance and withdraw the pinion of the starter is not represented.

In order to combat the electromagnetic disturbances generated by the rotation of the electric motor M when it is functioning, the invention proposes integration in the electric circuit 3 of an electronic filter 10 disposed inside the starter D.

According to the example illustrated in FIG. 1, the electronic filter 10 is placed inside a first cover 11 of the electromagnetic contactor C. The first cover 11 is then formed such as to define a chamber 12 for receipt of the electronic filter 10, as is apparent in FIGS. 2 and 3.

Figure 4:
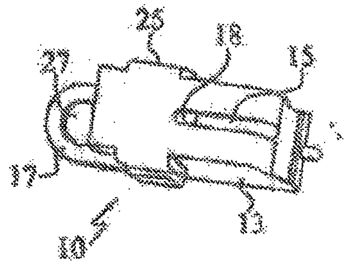
FIGS. 4 and 5 are schematic perspective views showing the electronic filter illustrated in FIG. 3 on an enlarged scale.
Figure 5:
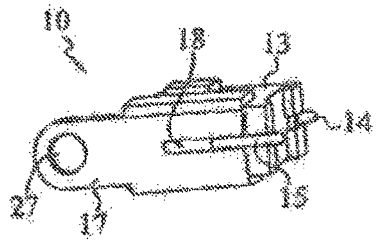

According to the example illustrated, the electronic filter 10 is of the passive type, and as shown in FIGS. 4 and 5, it comprises a capacitor 13, the two lugs 14 and 15 of which are each associated with a connector 16, 17. Each connector 16, 17 is then crimped on the corresponding paste[1] 14, 15. For this purpose, each connector 16, 17 comprises a slot 18 with a width slightly smaller than the diameter of the corresponding lug, such that, when the lug is engaged by being forced into the slat, or the slot is forced onto the lug, a large contact surface is obtained between the connector and the said lug. The quality of this connection can also be improved by the production of a single welding spot, not represented.

The electronic filter 10 is thus disposed inside the chamber 12, such as to be crimped between an inner plate 19 and the inner surface of the cover 11, such that the electronic filter is perfectly immobilised by the cover 11. In order to take into account the manufacturing tolerances of the cover 11, and of the electronic filter 10 and the other component elements of the electromagnetic contactor C, such as the inner plate 19, in this case a resiliently deformable element 20 is used, against which the filter 10 is pressed. In the present case the resiliently deformable element 20 is interposed between the filter 10 and the inner plate 19. It will be appreciated that the resiliently deformable element 20 could also be interposed between the filter 10 and the cover 12. It could also be envisaged to implement two resiliently deformable elements, one interposed between the electronic filter 10 and the inner plate 19, whereas the other one would be interposed between the electronic filter 10 and the cover 11. The resiliently deformable element 20 can be produced in any appropriate manner, for example in the form of a tongue made of a natural or synthetic elastomer material. It should be noted that the resiliently deformable element 20 also provides a function of damping of the vibrations sustained by the electronic filter 10.

According to the example illustrated, one of the connectors 16 of the filter 10 comprises a connection finger 25 which extends outside the cover 11, such as to be connected by a metal tongue 26 to a terminal 1 of the contactor C. The other connector 17 comprises an opening 27 which is designed to be engaged on a connection pin 28 inside the contactor C. This embodiment of the connectors 16 and 17 makes it possible to facilitate the integration of the electronic filter in the starter B.

Figure 2:
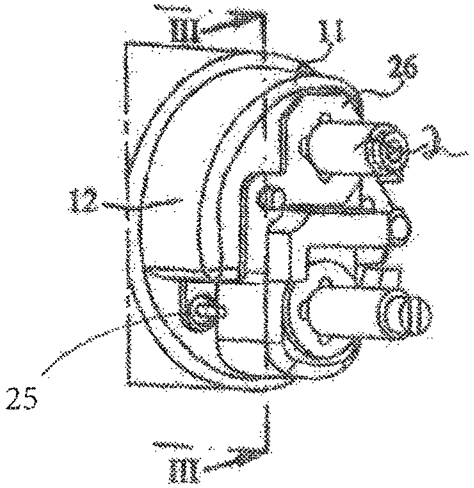
FIG. 2 is a partial perspective view showing a cover of an electromagnetic switch of the starter illustrated in FIG. 1.
Figure 3:
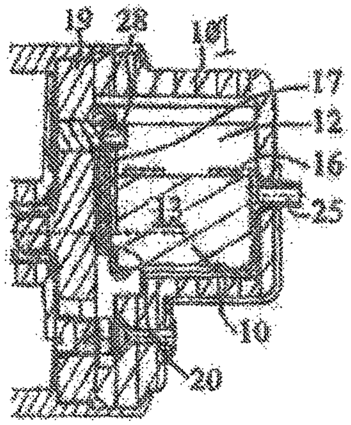
FIG. 3 is a partial cross-section, according to the plane III-III in FIG. 2, showing a possible implementation of an electronic filter of the starter according to the invention.

According to the example illustrated in FIGS. 1 to 3, the electronic filter 10 is disposed in the first cover 11 of the electromagnetic contactor C. However, an implantation configuration of this type is not strictly necessary for the creation of the invention. Thus, FIG. 6 shows another variant of the invention according to which the starter D comprises the first cover 11 which covers at least partly the electromagnetic contactor C, and a second cover 30 which covers at least partly the electric motor M. According to this variant embodiment, the electronic filter 10 is disposed inside the electric motor, such as to be covered by the second cover 30.

It will be appreciated that other modifications or variants of the invention can be envisaged within the context of the appended claims.

The invention claimed is:

1. An electric starter for an internal combustion engine, comprising:

- an electric motor (M) operatively connected to a driving device (R, L) for driving the internal combustion engine, comprising a positive terminal and a negative terminal;
- an electronic filter (10) comprising a positive terminal connected electrically to the positive terminal of the electric motor (M), and configured to attenuate electromagnetic disturbances generated by rotation of the electric motor (M);
- a launcher (L) a drive pinion gear rotatable around a longitudinal axis (X) and moveable in axial translation along the longitudinal axis (X) between a position of rest and a position of driving of the internal combustion engine;
- a gear speed reducer for rotating the launcher by the electric motor (M); and
- an electromagnetic switch (C) configured to control the power of the electric motor (M) and to control the displacement of the launcher (L) between the position of rest and the position of driving of the launcher (L), the electromagnetic switch (C) comprising an output terminal connected to the positive terminal of the filter and to the positive terminal of the motor (M);
- the electronic filter (10) placed inside a cover (11, 30) of the starter;
- the cover (11, 30) at least partly covering the electromagnetic switch (C); and
- the electronic filter (10) covered by the cover of the electric switch (C).

2. The starter according to claim 1, wherein the cover covers at least partly one of the electric motor (M) and the electromagnetic switch (C).

3. The starter according to claim 2, wherein the electronic filter (10) comprises connectors (17) which are crimped onto the lugs of the electronic components which constitute the filter.

4. The starter according to claim 2, wherein the cover (11, 30) comprises an immobilizing device for immobilizing the electronic filter (10) inside the cover (11, 30).

5. The starter according to claim 1, wherein the cover comprises a first cover (11) which covers at least partly the electromagnetic switch (C) and a second cover (30) which covers at least partly the electric motor (M).

6. The starter according to claim 5, wherein the first cover (11) covers the electronic filter (10).

7. The starter according to claim 6, wherein the electronic filter (10) comprises connectors (17) which are crimped onto the lugs of the electronic components which constitute the filter.

8. The starter according to claim 5, wherein the cover (11, 30) comprises an immobilizing device for immobilizing the electronic filter (10) inside the cover (11, 30).

9. The starter according to claim 6, wherein the cover (11, 30) comprises an immobilizing device for immobilizing the electronic filter (10) inside the cover (11, 30).

10. The starter according to claim 5, wherein the second cover (30) covers the electronic filter (10).

11. The starter according to claim 10, wherein the electronic filter (10) comprises connectors (17) which are crimped onto the lugs of the electronic components which constitute the filter.

12. The starter according to claim 10, wherein the cover (11, 30) comprises an immobilizing device for immobilizing the electronic filter (10) inside the cover (11, 30).

13. The starter according to claim 5, wherein the electronic filter (10) comprises connectors (17) which are crimped onto the lugs of the electronic components which constitute the filter.

14. The starter according to claim 1, wherein the cover (11, 30) comprises an immobilizing device for immobilizing the electronic filter (10) inside the cover (11, 30).

15. The starter according to claim 14, wherein the electronic filter (10) is pressed against a resiliently deformable element (20) for elimination of play.

16. The starter according to claim 15, wherein the electronic filter (10) comprises connectors (17) which are crimped onto the lugs of the electronic components which constitute the filter.

17. The starter according to claim 14, wherein the electronic filter (10) comprises connectors (17) which are crimped onto the lugs of the electronic components which constitute the filter.

18. The starter according to claim 14, wherein the immobilizing device comprises a resilient element (20) resiliently pressing against the electronic filter (10).

19. The starter according to claim 1, wherein the electronic filter (10) comprises connectors (17) crimped onto the lugs of the electronic components which constitute the filter.

20. The starter according to claim 1, wherein the electronic filter (10) comprises connectors (17) which are crimped onto the lugs of the electronic components which constitute the filter.

* * * * *